United States Patent

Muramatsu et al.

[11] Patent Number: 6,017,024
[45] Date of Patent: Jan. 25, 2000

[54] FLUID-FILLED VIBRATION DAMPING DEVICE HAVING PNEUMATICALLY OSCILLATED MEMBER PARTIALLY DEFINING AUXILIARY FLUID CHAMBER

[75] Inventors: Atsushi Muramatsu, Komaki; Masahiko Nagasawa, Kani, both of Japan

[73] Assignee: Tokai Rubber Industries, Ltd., Japan

[21] Appl. No.: 08/994,349

[22] Filed: Dec. 19, 1997

[30] Foreign Application Priority Data

Dec. 25, 1996 [JP] Japan ................................. 8-345269

[51] Int. Cl.[7] ........................................................ F16F 5/00
[52] U.S. Cl. ................................. 267/140.14; 267/140.15
[58] Field of Search ........................ 267/140.13, 140.14, 267/140.15, 140.12, 219

[56] References Cited

U.S. PATENT DOCUMENTS

| | | | |
|---|---|---|---|
| 4,828,234 | 5/1989 | Hoying et al. | 267/140.1 |
| 5,098,072 | 3/1992 | Muramatsu et al. | 267/140.1 |
| 5,114,124 | 5/1992 | Muramatsu | 267/140.1 |
| 5,145,156 | 9/1992 | Muramatsu et al. | 267/140.14 |
| 5,170,998 | 12/1992 | Muramatsu | 267/140.13 |
| 5,180,148 | 1/1993 | Muramatsu | 267/140.14 |
| 5,217,211 | 6/1993 | Ide et al. | 267/140.13 |
| 5,246,212 | 9/1993 | Funahashi et al. | 267/140.13 |
| 5,314,173 | 5/1994 | Ide et al. | 267/140.14 |
| 5,769,402 | 6/1998 | Ide et al. | 267/140.15 |

FOREIGN PATENT DOCUMENTS

| | | |
|---|---|---|
| 0 115 417 A2 | 8/1984 | European Pat. Off. . |
| 0 164 081 A2 | 12/1985 | European Pat. Off. . |
| 0 440 260 A1 | 8/1991 | European Pat. Off. . |
| 0 690 244 A1 | 1/1996 | European Pat. Off. . |
| 2 663 706-A1 | 12/1991 | France . |
| 34 47 746 A1 | 7/1986 | Germany . |
| 36 38 944 A1 | 6/1987 | Germany . |
| 61-191543 | 11/1986 | Japan . |

OTHER PUBLICATIONS

Patent Abstracts of Japan; vol. 016, No. 191 (M–1245), May 8, 1992 & JP 04 025635 A (Bridgestone Corp), Jan. 29, 1992, *abstract*.

Patent Abstracts of Japan; vol. 011, No. 140 (M–586), May 8, 1987 & JP 61 278639 A (Nissan Motor Co Ltd), Dec. 9, 1986, *abstract*.

Patent Abstracts of Japan; vol. 017, No. 572 (M–1497), Oct. 18, 1993 & JP 05 164183 A (Bridgestone Corp), Jun. 29, 1993, *abstract*.

Primary Examiner—Robert J. Oberleitner
Assistant Examiner—Mariano Sy
Attorney, Agent, or Firm—Parkhurst & Wendel, L.L.P.

[57] ABSTRACT

A fluid-filled vibration damping device including an elastic body connecting two mutually spaced-apart mounting members and partially defining a primary fluid chamber filled with a non-compressible fluid a pressure of which changes upon application of a vibrational load between the mounting members, and a movable member which partially defines an auxiliary fluid chamber filled with the non-compressible fluid and communicating with the primary fluid chamber through an orifice. The movable member is oscillated to cause a periodic pressure change of the fluid in the auxiliary fluid chamber, by a periodic change of an air pressure which is applied to a working air chamber formed on one of opposite sides of the movable member which is remote from the auxiliary fluid chamber.

9 Claims, 5 Drawing Sheets

FLUID-FILLED VIBRATION DAMPING DEVICE HAVING PNEUMATICALLY OSCILLATED MEMBER PARTIALLY DEFINING AUXILIARY FLUID CHAMBER

The present application is based on Japanese Patent Application No. 8-345269 filed Dec. 25, 1996, the content of which is incorporated hereinto by reference.

BACKGROUND OF THE INVENTION

1. Field of the Invention

The present invention relates to a fluid-filled damping device which has a fluid chamber or chambers filled with a non-compressible fluid and which is capable of exhibiting a high damping effect with respect to input vibrations, by positively utilizing flows of the fluid and changing the pressure of the fluid within the fluid chamber or chambers.

2. Discussion of the Related Art

As one type of a vibration damper interposed between two members of a vibration system so as to flexibly connect these two members or mount one of these members on the other member in a vibration damping manner, there is known a fluid-filled vibration damping device as disclosed in JP-U-61-191543 (laid-open publication of Japanese Utility Model Application). Such a fluid-filled vibration damping device includes: a first and a second mounting member which are spaced apart from each other; an elastic body elastically connecting the first and second mounting members and partially defining a primary fluid chamber filled with a non-compressible fluid the pressure of which changes upon application of a vibrational load between the first and second mounting members; a movable member which partially defines an auxiliary fluid chamber filled with the non-compressible fluid and which is oscillated to cause a periodic change of a pressure of the fluid in the auxiliary fluid chamber; and means for defining an orifice for fluid communication between the primary and auxiliary fluid chambers. In this type of vibration damping device, the pressure change induced in the auxiliary fluid chamber by the oscillation of the movable member is controlled in view of the pressure change which is induced in the primary fluid chamber as a result of elastic deformation of the elastic body upon application of the vibrational load. With the pressure change in the auxiliary fluid chamber being controlled, the flows of the fluid through the orifice can be controlled, so that the vibration damping device exhibits a high vibration damping effect, based on the resonance of the fluid flowing through the orifice, or based on the fluid pressure change which is induced in the auxiliary fluid chamber and which is transmitted to the primary fluid chamber through the orifice.

The known fluid-filled vibration damping device described above must incorporate electromagnetic drive means for oscillating the movable member, as described in the above-identified publication. The electromagnetic drive means includes a relatively large number of comparatively expensive components such as a permanent magnet, a coil and a yoke member. Accordingly, the known damping device tends to suffer from difficulty of manufacture at a low cost, and inevitably has other problems such as an increase in size and weight.

For assuring a sufficient degree of stability of the electromagnetic force generated by the electromagnetic drive means, the coil, permanent magnet and other components must be built in the damping device with high positional and dimensional accuracy, requiring a high level of skill for the manufacture, and reducing the efficiency of manufacture of the damping device in a large scale.

Further, the known fluid-filled vibration damping device suffers from other problems such as a temperature rise due to heat generated by energization of the coil, and a relatively large amount of electric power consumption, where the oscillation of the movable member is required to be effected continuously for a long time or with a large drive force, depending upon the specific operating condition or required operating characteristics of the damping device.

SUMMARY OF THE INVENTION

It is therefore a first object of this invention to provide a relatively small-sized, light-weight fluid-filled vibration damping device which is simple in construction with a relatively small number of components, and which incorporates a novel mechanism suitable for oscillating the movable member so as to effectively control the fluid pressure within the auxiliary fluid chamber.

It is a second object of this invention to provide a fluid-filled vibration damping device capable of controlling the liquid pressure in the auxiliary fluid chamber continuously for a long time by oscillation of the movable member, with improved stability, without the conventionally encountered problems such as heat generation and requirement for large electric power consumption by the oscillating mechanism for the movable member.

The above objects may be achieved according to the principle of the present invention, which provides a fluid-filled vibration damping device including (a) a first and a second mounting member which are spaced apart from each other, (b) an elastic body elastically connecting the first and a second mounting members and partially defining a primary fluid chamber filled with a non-compressible fluid a pressure of which changes upon application of a vibrational load between the first and second mounting members; (c) movable member which partially defines an auxiliary fluid chamber filled with the non-compressible fluid and which is oscillated to cause a periodic change of a pressure of the fluid in the auxiliary fluid chamber; and (d) means for defining an orifice for fluid communication between the primary and auxiliary fluid chambers, the fluid-filled vibration damping device being characterized in that the movable member partially defines a working air chamber on one of opposite sides thereof which is remote from the auxiliary fluid chamber, the movable member being oscillated by a periodic change of an air pressure which is applied to the working air chamber.

In the fluid-filled vibration damping device constructed according to the present invention as described above, the movable member is oscillated by a periodic change of the air pressure in the working air chamber, whereby the pressure of the fluid in the auxiliary fluid chamber is periodically changed. In other words, the periodic change of the air pressure in the working air chamber is transferred to the auxiliary fluid chamber through the oscillation of the movable member, so that the fluid pressure in the auxiliary fluid chamber can be controlled by controlling the air pressure in the working air chamber, so as to permit the damping device to exhibit a high vibration damping effect on the basis of the flows of the fluid through the orifice and the fluid pressure in the primary fluid chamber which is controlled through the orifice. The periodic change of the air pressure in the working air chamber may be caused by connection of the working air chamber alternately to a negative (vacuum) or positive pressure source and the atmosphere.

The present fluid-filled vibration damping device does not incorporate or require any actuator such as electromagnetic drive device for oscillating the movable member, but is capable of controlling the fluid pressure within the auxiliary fluid chamber. Accordingly, the present damping device is simple and compact in construction with a reduced number of components and a reduced weight, and is therefore comparatively easy and economical to manufacture.

Further, the present fluid-filled vibration damping device permits the fluid pressure within the auxiliary fluid chamber to be suitably changed by utilizing an external air pressure source. The use of the air pressure from the pressure source permits a continuous operation of the damping device so as to exhibit a desired vibration damping effect with high stability, without the conventionally experienced drawbacks such as a temperature rise of the device due to heat generated by the electromagnetic drive means and a relatively large amount of consumption of electric power. Where the present damping device is used for a motor vehicle having an internal combustion engine, the reduced pressure for the damping device is readily available from the engine, and a vacuum pressure source exclusively used for the damping device is not necessary.

According to one preferred form of the present invention, the movable member includes a rubber member which produces an elastic force for restoring the rubber member to an original shape thereof during oscillation thereof.

In the above form of the invention, the air pressure change in the working air chamber can be effectively transmitted to the auxiliary fluid chamber through the elastic deformation or displacement of the elastic or rubber member, while assuring a high degree of fluid tightness between the auxiliary fluid chamber and the working air chamber. The use of the rubber member for the movable member is effective to improve the response of the fluid pressure in the auxiliary fluid chamber and the response of the damping device.

In addition, suitable adjustment of the spring stiffness of the rubber member permits the movable member to be restored to its original position by the elastic force produced by the rubber member, when the air pressure in the working air chamber is changed after the movable member is moved or displaced with elastic deformation of the rubber member. The use of the rubber member for the movable member permits the oscillation of the movable member by periodically changing the air pressure in the working air chamber between two different negative values or between two different positive values, or alternatively between the atmospheric pressure and a predetermined negative or positive value.

The rubber member may be provided with a relatively rigid member fixed thereto for restricting or controlling the amount and direction of deformation or displacement of the rubber member.

According to another preferred form of this invention, the fluid-filled vibration damping device further comprises biasing means for biasing the movable member in a predetermined direction. A coil spring may preferably be used as the biasing means.

In the above form of the invention, the movable member may be oscillated by alternate application of: two different values of negative pressure; two different values of positive pressure; negative and atmospheric pressures; or positive and atmospheric pressures. In either of these cases, the biasing means may be provided to bias the movable member in a selected biasing direction, so that the movable member which has been displaced from a first position to a second position in the direction opposite to that biasing direction by application of an air pressure is returned to the first position with the aid of the biasing force of the biasing means. Thus, the biasing means assures stable oscillation of the movable member, and accurate and stable control of the fluid in the auxiliary fluid chamber.

Where the movable member includes a rubber member which produces an elastic force acting on the movable member so as to be restored to its original position, the biasing means reduces the fatigue of the rubber member, permitting the rubber member to maintain its original characteristic of displacement or deformation for a long time, and making it possible to maintain the desired characteristic of control of the fluid pressure in the auxiliary fluid chamber for a long time, leading to improved stability of vibration damping performance of the damping device.

In a further preferred form of the invention, the movable member consists of a plurality of mutually independent movable members which partially define respective mutually independent auxiliary fluid chambers which communicate with the primary fluid chamber through respective mutually independent orifices.

In the above form of the invention, the fluid pressures in the plurality of auxiliary fluid chambers can be controlled independently of each other by controlling the air pressures in the plurality of working air chambers independently of each other. Accordingly, the vibration damping characteristic of the damping device can be changed as needed by rendering operative a selected one or ones of the orifices, depending upon the specific nature of the input vibrational load to be damped. Thus, the provision of the two or more working air chambers increases a freedom of choice of the vibration damping characteristic of the damping device. Described more specifically, the plurality of orifices are tuned to different frequency bands of the input vibration, and one of the orifices which corresponds to the frequency band of the input vibration is made operative to damp the vibration in this frequency band, by periodically changing the air pressure in the corresponding one of the working air chambers. In this case, it is desirable to hold the air pressure in the other working air chambers at the atmospheric value or at a predetermined positive or negative value so that the corresponding orifices are substantially closed and held inoperative.

According to a yet further preferred form of the invention, the fluid-filled vibration damping device further comprises at least one flexible diaphragm each partially defining an equilibrium fluid chamber filled with the non-compressible fluid such that a volume of the equilibrium fluid chamber is variable, and means for defining at least one communication passage for fluid communication between the equilibrium fluid chamber and the primary fluid chamber. Two or more communication passages may be provided for fluid communication between the primary fluid chamber and the equilibrium chamber partially defined by each flexible diaphragm. The primary fluid chamber may communicate with two or more equilibrium fluid chambers.

In the above form of the invention, a pressure change of the fluid in the primary fluid chamber upon application of the vibrational load to the damping device causes a difference between the fluid pressure in the primary fluid chamber and the fluid pressure in the equilibrium fluid chamber or chambers, so that the fluid is forced to flow through the communication passage or passages between the primary fluid chamber and the equilibrium fluid chamber or chambers. Based on the resonance of the fluid flowing through the communication passage or passages, the input vibration is effectively damped.

The communication passage or passages for fluid communication between the primary fluid chamber and the equilibrium fluid chamber or chambers can be tuned to a frequency band of the vibration which is different from that of the orifice for fluid communication between the primary and auxiliary fluid chambers. Accordingly, the present damping device exhibits an intended damping effect with respect to a wider range of frequency of the input vibration.

In one advantageous arrangement of the above form of the invention, the communication passage or passages for fluid communication between the primary fluid chamber and the equilibrium fluid chamber and the orifice for fluid communication between the primary and auxiliary fluid chambers are tuned such that a frequency of the vibrational load which is effectively damped by the flows of the fluid through the communication passage or passages is lower than that of the vibrational load which is effectively damped by the flows of the fluid through the orifice. This arrangement permits easy and effective damping of the input vibrations in different frequency bands, based on the flows of the fluid through the communication passage(s) and the flows of the fluid through the orifice, respectively, without having to use exclusive fluid flow control means such as a mechanism for limiting the fluid flow through the communication passage(s) or a mechanism for selectively opening and closing the communication passage(s).

When the damping effect provided by the damping device is based on the fluid flows through the communication passage or passages between the primary fluid chamber and the equilibrium fluid chamber, the air pressure in the working air chamber may be held at a predetermined value (positive, atmospheric or negative value) so as to hold the orifice in a substantially closed state. Alternatively, the air pressure may be periodically changed at a frequency corresponding to the frequency of the input vibration, to oscillate the movable member for inducing a periodic change of the fluid pressure in the auxiliary fluid chamber, so that this periodic change is transferred to the primary fluid chamber through the orifice, so as to increase the amount of change of the fluid pressures in the primary and auxiliary fluid chambers relative to each other, for thereby increasing the amount of flows of the fluid through the communication passage(s), to improve the damping effect based on the fluid flows through the communication passage(s).

According to a still further preferred form of this invention, the first mounting member consists of an inner sleeve, while the second mounting member consists of an outer sleeve disposed radially outwardly of the inner sleeve, and the elastic body is interposed between the inner and outer sleeves. In this form of the invention, the primary and auxiliary fluid chambers formed between the inner and outer sleeves are spaced from each other in a circumferential direction of the inner and outer sleeves.

The fluid-filled vibration damping device according to the above form of the invention, which may be referred to as a cylindrical damper, can be suitably used as an engine mount, a differential mount or a suspension bushing, for front-engine front-drive motor vehicle, for example. In the instant cylindrical damper, the space between the inner and outer sleeves can be efficiently utilized for forming the primary and auxiliary fluid chambers, resulting compact overall construction of the damping device.

In one advantageous arrangement of the above form of the invention, the damping device using the inner and outer sleeves as the first and second mounting members further comprises an intermediate sleeve which is fitted on an outer circumferential surface of the elastic body and which has a window formed therethrough, and the elastic body has a pocket formed in its outer circumferential surface and open in an outer circumferential surface of the intermediate sleeve through the window. The outer sleeve is fitted on the outer circumferential surface of the intermediate sleeve so as to close the window, and cooperates with the pocket to define the primary fluid chamber. The intermediate sleeve has a recessed portion open in its outer circumferential surface, and the movable member cooperates with the outer sleeve to define the working air chamber on one of the opposite sides of the movable member, and cooperates with the recessed portion to define the auxiliary fluid chamber on the other side of the movable member.

In the damping device according to the above arrangement, the space between the inner and outer sleeves can be effectively utilized to provide the working air chamber as well as the primary and auxiliary fluid chambers, with the movable member cooperating with the intermediate and outer sleeves to define the auxiliary fluid chamber and the working air chamber on its opposite sides. Thus, the damping device is made compact in construction with a relatively small number of components.

According to yet another preferred form of this invention, the fluid-filled vibration damping device further comprises a pressure control device connected to the working air chamber, for changing the air pressure in the working air chamber in synchronization with a frequency of the vibrational load to be damped by the damping device.

In the fluid-filled vibration damping device according to the above preferred form of the invention, the fluid pressure in the auxiliary fluid chamber is controlled depending upon the frequency of the vibrational load applied to the damping device, so that the fluid pressure difference corresponding to the input vibration is induced between the primary and auxiliary fluid chambers, whereby the amount of the fluid flowing through the orifice based on the fluid pressure difference is effectively increased. Thus, the present damping device exhibits an improved vibration damping effect based on the flows of the fluid through the orifice between the primary and auxiliary fluid chambers.

To change the air pressure in the working air chamber in synchronization with the frequency of the input vibration, the pressure control device may preferably include an air pressure source such as a vacuum pressure source, and a switch valve for selectively connecting the working air chamber to the air pressure source and the atmosphere. For facilitating the control of the switch valve at a relatively high frequency, the switch valve is desirably a solenoid-operated switch valve, which may be controlled in a known adaptive control fashion or according to a stored data map, on the basis of an output signal of a vibration sensor such as an acceleration sensor.

BRIEF DESCRIPTION OF THE DRAWINGS

The above and optional objects, features, advantages and technical and industrial significance of this invention will be better understood by reading the following detailed description of presently preferred embodiments or modes of the invention, when considered in connection with the accompanying drawings, in which.

DETAILED DESCRIPTION OF THE PREFERRED EMBODIMENTS

Figure 1:
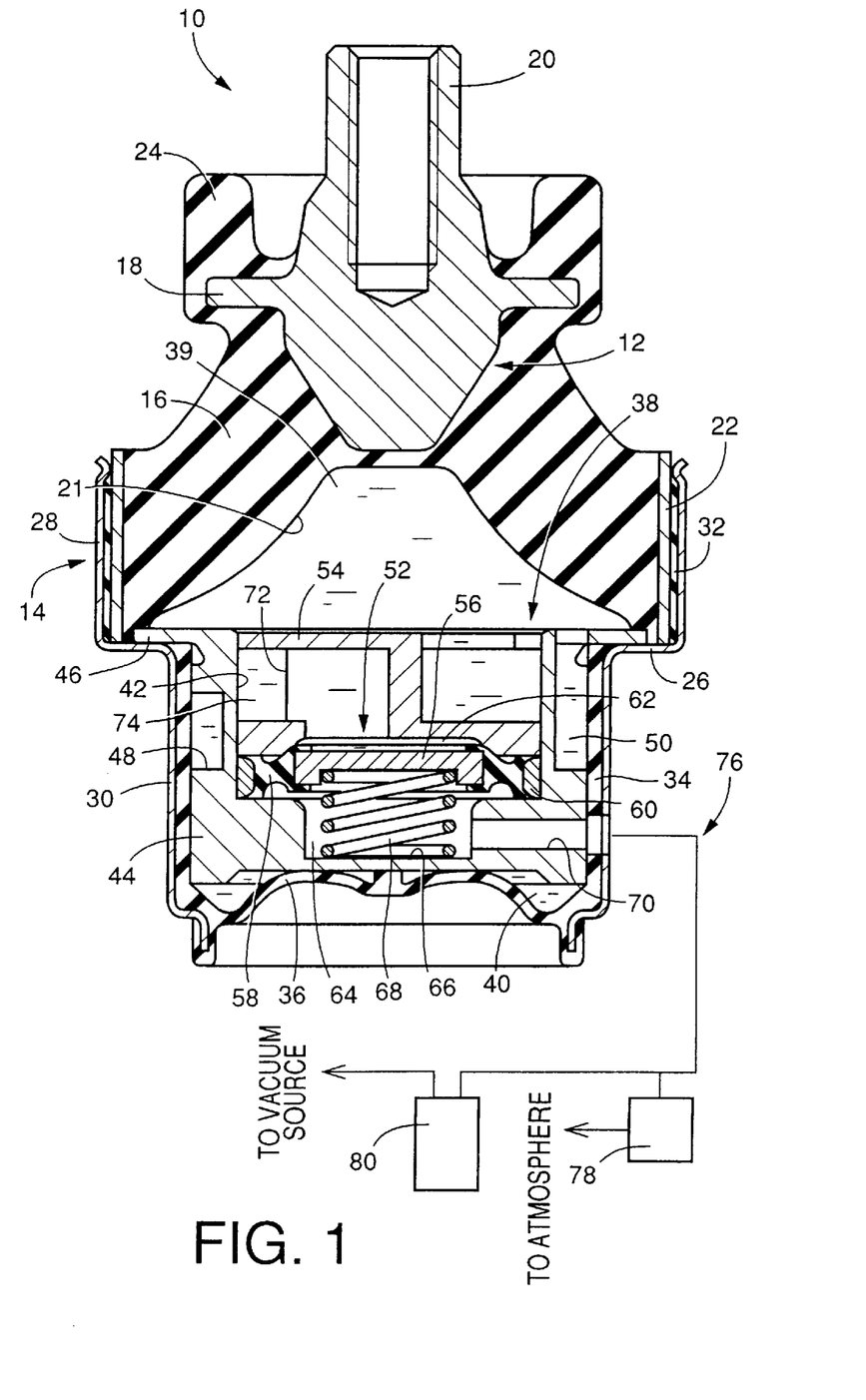
FIG. 1 is an elevational view in axial or vertical cross section of a fluid-filled vibration damping device in the form of an engine mount constructed according to a first embodiment of this invention.

Referring first to FIG. 1, there is shown an engine mount 10 for a motor vehicle, as one embodiment of the fluid-filled vibration damping device of the present invention. This engine mount 10 includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 made of a rubber material. The first and second mounting members 12, 14 are attached to a power unit and a body of the motor vehicle, respectively, so that the power unit which includes an engine is mounted on the vehicle body in a vibration damping fashion. With this engine mount 10 installed on the vehicle as described above, the elastic body 16 is held elastically compressed with the weight of the power unit acting on the engine mount 10. The engine mount 10 is installed so as to damp input vibrations which are applied in the direction in which the two mounting members 12, 14 are opposed to each other, namely, in the vertical direction as seen in FIG. 1 and in a direction almost parallel to the vertical direction.

The first mounting member 12 includes a body portion having an inverted generally frusto-conical shape, and an annular plate portion 18 which is formed integrally with the body portion at its large-diameter end, so as to extend radially outwardly from the outer circumferential surface of the body portion. The first mounting member 12 further includes a threaded mounting portion 20 which is also formed integrally with the body portion, so as to extend axially upwardly from the large-diameter end of the body portion. The threaded mounting portion 20 has a tapped hole formed to receive a screw for attaching the first mounting member 12 to the power unit of the vehicle.

The first mounting member 12 is bonded to the elastic body 16 in the process of vulcanization of a rubber material for forming the elastic body 16. The elastic body 16 has a generally frusto-conical shape having a relatively large diameter. The elastic body 16 has a recess 21 open in its large-diameter end face. The first mounting member 12 and the elastic body 16 are bonded together such that the body portion of the first mounting member 12 is embedded in the small-diameter end portion of the elastic body 16. To the outer circumferential surface of the large-diameter end portion of the elastic body 16, there is bonded a cylindrical connecting metal member 22 in the above-indicated process of vulcanization.

On the annular plate portion 18 of the first mounting member 12, there is formed a rubber buffer 24 integrally with the elastic body 16 such that the rubber buffer 24 extends in the axially upward direction of the elastic body 16. This rubber buffer 24 is provided for abutting contact with a stop portion provided on the vehicle body, for limiting the distance of displacement of the power unit relative to the vehicle body.

The second mounting member 14 is a generally cylindrical member with a relatively large diameter including an axially intermediate shoulder portion 26, an axially upper large-diameter portion 28 located on the upper side of the shoulder portion 26, and an axially lower small-diameter portion 30 located on the lower side of the shoulder portion 26. The second mounting member 14 is attached to the body of the motor vehicle through a suitable bracket. The inner circumferential surfaces of the large-diameter and small-diameter portions 28, 30 are substantially entirely covered by respective thin-walled sealing rubber layers 32, 34. The small-diameter portion 30 is fluid-tightly closed at its lower opening by a circular flexible diaphragm 36 which has a relatively small thickness. The flexible diaphragm 36 is bonded at its periphery to the lower end portion of the small-diameter portion 30 in the process of vulcanization of a rubber material for the diaphragm 36.

The second mounting member 14 is fixed to the large-diameter end portion of the elastic body 16 such that the large-diameter portion 28 is fluid-tightly fitted on the cylindrical connecting metal member 22. Thus, the first and second mounting members 12, 14 are elastically connected to each other through the elastic body 16, such that the elastic body 16 fluid-tightly closes the upper opening of the large-diameter portion 28, and cooperates with the second mounting member 14 and the flexible diaphragm 36 to define a fluid-tightly enclosed space which includes the recess 21 and which is located within the second mounting member 14.

The small-diameter portion 30 of the second mounting member 14 accommodates a partition member 38 which is a generally cylindrical structure. The partition member 38 is fixed in fluid-tight contact with the inner circumferential surface of the small-diameter portion 30, more precisely, with the inner circumferential surface of the sealing rubber layer 34. Thus, the partition member 38 divides the above-indicated space within the second mounting member 14 into two sections, namely, an upper section partially defined by the elastic body 16 and a lower section partially defined by the flexible diaphragm 36. Described more specifically, the partition member 38 cooperates with the elastic body 16 to define a primary fluid chamber 39 on its upper side, and cooperates with the flexible diaphragm 36 to define an equilibrium fluid chamber 40 on its lower side. These primary and equilibrium fluid chambers 39, 40 are filled with a suitable non-compressible fluid such as water, alkylene glycol, polyalkylene glycol or silicone oil. Upon application of a vibrational load between the first and second mounting members 12, 14, the pressure of the fluid within the primary fluid chamber 39 which is partially defined by the elastic body 16 changes due to elastic deformation of the elastic body 16. On the other hand, elastic deformation or displacement of the flexible diaphragm 36 permits easy change in the volume of the equilibrium fluid chamber 40.

The partition member 38 includes an outer wall member 44 which is a thick-walled generally cylindrically member having a central recess or hole 42 open in the axially upper end face. Namely, the generally cylindrical outer wall member 44 is open at its upper end and closed at its lower end. The outer wall member 44 has an integrally formed outward flange 46 at its upper open end, and is fixed to the second mounting member 14, with the outward flange 46 being held between the shoulder portion 26 of the second mounting member 14 and the elastic body 16. The outer wall member 44 has an outer groove 48 formed in its outer circumferential surface so as to extend in the circumferential direction. The outer groove 48 has a U shape in the cross sectional view of FIG. 1. The outer groove 48 is closed by the sealing rubber layer 34 on the inner surface of the small-diameter portion 30, whereby a fluid communication passage 50 is formed. Namely, the outer wall member 44 having the outer groove 48 cooperates with the small-diameter portion 30 having the sealing rubber layer 34 to define the communication passage 50 for fluid communication between the primary and equilibrium fluid chambers 39, 40, to permit the non-compressible fluid to flow between these chambers 39, 40 through the communication passage 50. In the present embodiment, the communication passage 50 is tuned, that is, the length and cross section area of the communication passages 50 are determined, so as to effectively damp the input vibrations having relatively low frequencies, on the basis of the resonance of the fluid flowing through the communication passage 50.

Within the central recess 42, there are accommodated a movable member 52 and a closure member 54 such that these members 52, 54 are arranged in the axial direction of the cylindrical outer wall member 44 of the partition member 38. The movable member 52 is a generally disk-like member consisting of a circular metal disk 56, and an annular rubber member 58 bonded by vulcanization to the outer circumferential surface of the metal disk 56. A fitting ring 60, which is bonded by vulcanization to the annular rubber member 58, is press-fitted in the central recess 42 of the outer wall member 44, so that the movable member 52 is disposed in the bottom portion of the central recess 42, such that the movable member 52 extends in the radial direction of the member 44. On the other hand, the closure member 54 is a thick-walled generally disk-like member which is press-fitted in the upper portion of the central recess 42 of the outer wall member 44, such that the closure member 54 closes the upper opening of the central recess 42 (upper open end of the outer wall member 44).

The interior space of the central recess 42, which is defined by the outer wall member 44 and the closure member 54 closing the upper opening of the central recess 42, is fluid-tightly divided by the movable member 52 into two sections one of which serves as an auxiliary fluid chamber 62 filled with the same non-compressible fluid as the fluid filling the primary fluid chamber 39. In other words, the movable member 52 cooperates with the members 44, 54 to define the auxiliary fluid chamber 62 located on the upper side of the movable member 52. The closure member 54 has an outer groove 72 formed in its outer circumferential surface so as to extend in the circumferential direction. This outer groove 72 is closed by the inner circumferential surface of the cylindrical wall of the outer wall member 44, whereby a orifice 74 is formed. Namely, the closure member 54 having the groove 72 cooperates with the outer wall member 44 to define the orifice 74 for fluid communication between the primary and auxiliary fluid chambers 39, 62, to permit the non-compressible fluid to flow between these two chambers 39. 62 through the orifice 74. In the present embodiment, the orifice 74 is tuned to effectively damp the input vibrations whose frequencies are higher than the resonance frequency of the fluid forced to flow through the communication passage 50 between the primary and equilibrium fluid chambers 39, 40. For instance, the communication passage 50 is tuned to effectively damp low-frequency vibrations such as engine shakes, while the orifice 74 is tuned to effectively damp medium-frequency vibrations such as engine idling vibrations. Alternatively, the communication passage 50 is tuned to damp engine idling vibrations and other medium-frequency vibrations, while the orifice 74 is tuned to damp booming noise and other high-frequency vibrations.

The other of the above-indicated two sections of the interior space of the central recess 42 is used as a working air chamber 64. That is, the movable member 52 and the bottom portion of the outer wall member 44 cooperate to define the working air chamber 64 located on the lower side of the movable member, which is remote from the auxiliary fluid chamber 62. The bottom wall of the outer wall member 44 has a central bottom hole 66 having a relatively small diameter. This bottom hole 66 communicates with the working air chamber 64, and accommodates a part of a coil spring 68 which biases the movable member 52 in a direction away from the bottom wall of the outer wall member 44 toward the auxiliary fluid chamber 62. With the biasing force of the coil spring 68 acting on the movable member 52, the annular rubber member 58 of the movable member 52 is elastically deformed toward the auxiliary fluid chamber 62, and the metal disk 56 of the movable member 52 is normally held in an upper position which is spaced apart from the bottom wall of the outer wall member 44 by a predetermined distance in the direction toward the auxiliary fluid chamber 62.

An air passage 70 communicating with the working air chamber 64 (bottom hole 66) is formed through the outer wall member 44 and the second mounting member 14. The air passage 70 is connected at its outer end to an external air conduit 76, which in turn is connected to a switch valve 78. This switch valve 78 has a first position for connecting the air conduit 76 to the atmosphere, and a second position for connecting the air conduit 76 to a vacuum tank 80 which is connected to a suitable vacuum source. Thus, the working air chamber 64 is selectively connectable to the atmosphere and a reduced pressure in the vacuum tank 80, by switching operations of the switch valve 78 between the first and second positions. Described more specifically, the switch valve 78 is switched at a predetermined or controlled frequency to alternately apply the atmospheric pressure and the reduced pressure to the working air chamber 64 through the air conduit 76 and the air passage 70, so as to induce a periodic change of the air pressure in the working air chamber 64.

Described in detail, the movable member 52 is placed in the above-indicated upper position on the side of the auxiliary fluid chamber 62 when the working air chamber 64 is connected to the atmosphere, that is, when the pressure in the working air chamber 64 is equal to the atmospheric pressure. The upper position is determined by the biasing force acting on the movable member 52 in the upward direction, and the elastic force produced owing to the elasticity or resiliency of the annular rubber member 58, which elastic force acts on the coil spring 68 so as to resist the biasing force of the coil spring 68. When the working air chamber 64 is connected to the vacuum tank 80, or when the reduced pressure of the vacuum tank 80 is applied to the working air chamber 64, the movable member 52 is moved to a lower position on the side of the bottom of the outer wall member 44, against the biasing force of the coil spring 68. When the pressure in the working air chamber 64 is changed from the reduced pressure to the atmospheric pressure, the movable member 52 is moved or restored to the upper position by the biasing force of the coil spring 68 and the elastic force of the rubber member 58. Thus, the movable member 52 is periodically reciprocated or oscillated in the axial direction of the engine mount 10, with the switch valve 78 being switched between the first and second positions at a given frequency.

With the movable member 52 being thus oscillated, the fluid pressure in the auxiliary fluid chamber 62 is periodically changed, whereby a difference between the fluid pressures in the primary and auxiliary fluid chambers 39, 62 is positively induced. By inducing the periodic change of the fluid pressure in the auxiliary fluid chamber 62 by oscillating the movable member 52 at a frequency corresponding to the frequency of the input vibrations, the fluid flows of the fluid through the orifice 74 between the auxiliary and primary fluid chambers 62, 39 can be positively induced. In other words, the amount of flow of the fluid through the orifice 74 can be effectively increased by the oscillation of the movable member 52, to enable the present fluid-filled engine mount 10 to exhibits an improved vibration damping effect based on the resonance of the fluid flows.

The fluid pressure in the primary fluid chamber 39 can be effectively controlled based on the resonance of the fluid within a resonance frequency range of the fluid flowing through the orifice 74. Accordingly, a relatively small amount of the fluid pressure change in the auxiliary fluid chamber 62, namely, a relatively small change of the air pressure change in the working air chamber 64 is effective to permit the engine mount 10 to provide a desired vibration damping characteristic. The level of the reduced pressure to be applied to the working air chamber 64, and the oscillation phase of the movable member 52 are suitably determined depending upon a time of delay of the transmission of the fluid pressure change from the auxiliary fluid chamber 62 to the primary fluid chamber 39, such that there exists a suitable phase difference between the oscillation of the movable member 52 and the input vibration. The switch valve 78 may be controlled in a feedback fashion or by other adaptive control methods so as to minimize or zero the control error, or according to a predetermined control pattern represented by a data map stored in a memory of a controller.

The present engine mount 10 does not require an actuator such as electromagnetic drive means, and is accordingly simple and compact in construction with reduced weight and is comparatively easy and economical to manufacture. The simple construction results in improved operating reliability and durability and comparatively easy maintenance or repair of the engine mount 10.

In other words, the present engine mount 10 is simple and compact in construction with reduced size and weight, but is capable of providing an excellent damping effect with various kinds of input vibrations, owing to the active control of the fluid pressure within the primary fluid chamber 39.

Further, the fluid pressure in the primary fluid chamber 39 can be controlled by utilizing the reduced air pressure, which is available on any motor vehicle having an internal combustion engine, that is, by utilizing the reduced pressure in the intake system of the engine. Thus, the instant engine mount 10 does not require an exclusive energy source for oscillating the movable member 52. Moreover, the engine mount 10 is advantageous in that only a small amount of change in the air pressure in the working air chamber 64 may cause a relatively large amount of control of the fluid pressure in the primary fluid chamber 39, by utilizing the resonance of the fluid flowing through the orifice 74, whereby the engine mount 10 is enabled to exhibit an intended vibration damping effect.

Where the engine mount 10 is used in an environment in which compressed air is readily available, a positive air pressure may be used in place of the reduced air pressure, for oscillating the movable member 52. While the present embodiment is adapted to alternately apply the reduced and atmospheric pressures to the working air chamber 64, the reduced or positive pressure may be periodically changed between two different reduced or positive levels.

In addition, the present engine mount 10 does not suffer from heat generation and extremely large electric power consumption due to energization of electromagnetic drive means, even when the movable member 52 is oscillated continuously for a long time.

The present engine mount 10 is also adapted such that the fluid is forced to flow through the communication passage 50 between the primary and equilibrium fluid chambers 39, 40, due to a fluid pressure difference between these chambers 39, 40, which is also induced upon application of the vibrational load. Accordingly, the engine mount 10 exhibits an excellent damping effect based on the resonance of the fluid flowing through the communication passage 50, with respect to the input vibration whose frequency band is different from that of the input vibration that can be effectively damped based on the resonance of the fluid flowing through the orifice 74 between the primary and auxiliary fluid chambers 39, 62. Thus, the present engine mount 10 is capable of effectively damping the input vibrations over a relatively wide range of frequency.

For improving the damping effect based on the resonance of the fluid flowing through the communication passage 50, it is effective and desirable to increase the amount of flow of the fluid through the communication passage 50, by holding the movable member 52 stationary in a predetermined position with a predetermined air pressure applied to the working air chamber 64, or by oscillating the movable member 52 with the oscillation phase that maximizes the amount of flow of the fluid through the communication passage 50 so as to increase the amount of change of the fluid pressure in the primary fluid chamber 39.

However, the equilibrium chamber 40 and the communication passage 50 are not essential, and are provided depending upon the desired vibration damping characteristics. Further, the primary and equilibrium fluid chambers 39, 40 may be communicated with each other by a plurality of communication passages which are tuned to respective different frequency bands of the input vibrations.

Figure 2:
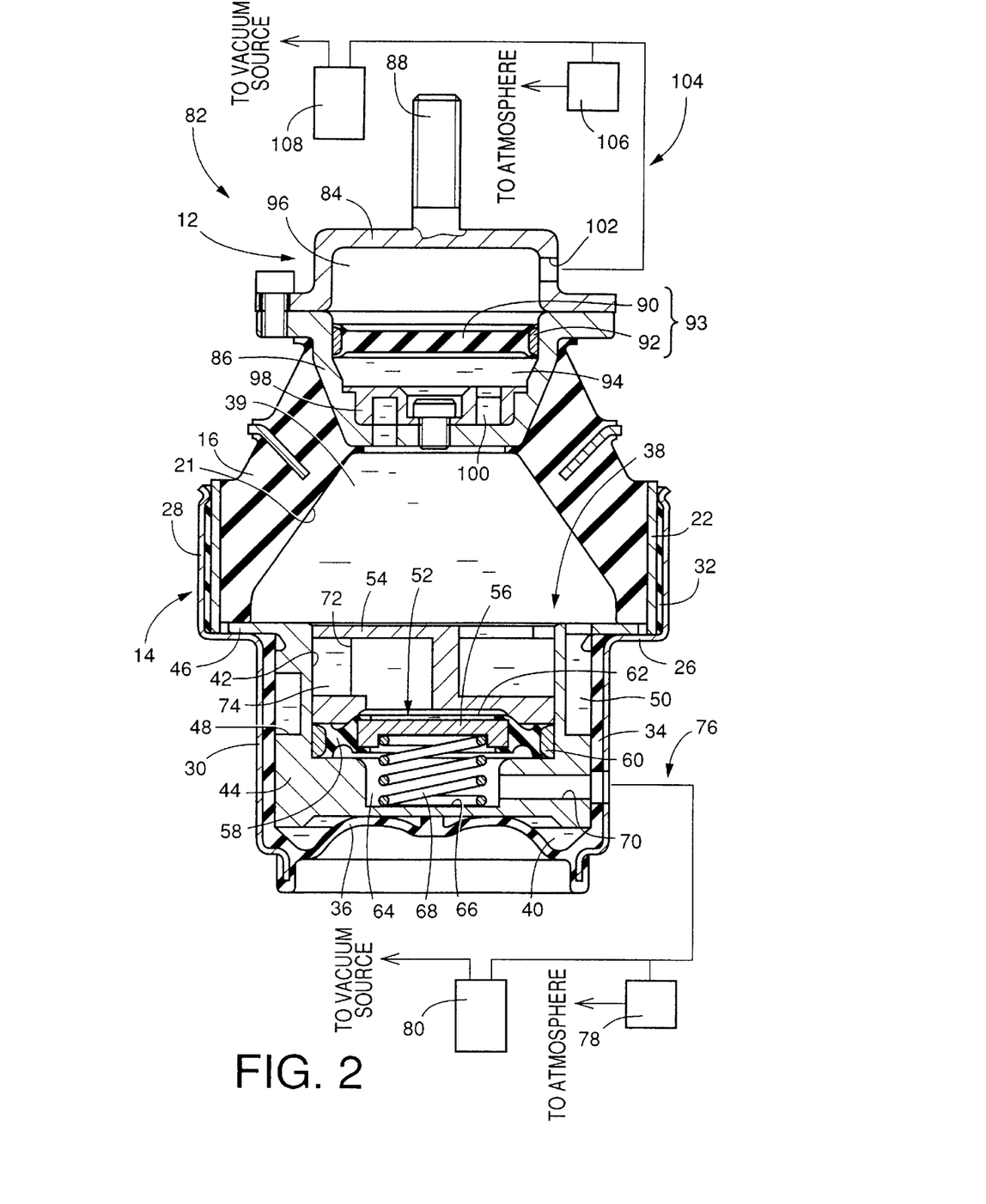
FIG. 2 is an elevational view in axial or vertical cross section of an engine mount constructed according to a second embodiment of the invention.

The engine mount 10 of FIG. 1 constructed according to the first embodiment of this invention has only one auxiliary fluid chamber 62 which communicates with the primary fluid chamber 39 through the orifice 74 and whose fluid pressure is periodically changed by the pneumatically oscillated movable member 52. However, the fluid-filled vibration damping device according to the principle of the present invention may have a plurality of auxiliary fluid chambers. An example of this modification is shown in FIG. 2, as an engine mount 82. In FIG. 2, the same reference numerals as used in FIG. 1 will be used to identify the structurally or functionally identical or corresponding elements, and redundant description of these elements will not be provided, in the interest of brevity and simplification of the description.

In the engine mount 82 of FIG. 2 according to the second embodiment, the first mounting member 12 consists of an upper metal member 84 and a lower metal member 86, which are both cup-shaped members each having an outward flange at its opening. The upper and lower metal members 84, 86 are superposed on each other at their outward flanges in the axial or vertical direction and are bolted together at the flanges, so as to constitute a hollow structure. The upper metal member 84 has a mounting screw 88 secured to its bottom wall so as to extend in the upward direction. The engine mount 82 is fixed with the mounting screw 88 to the power unit of the motor vehicle.

Within the hollow structure of the first mounting member 12, there is disposed a rubber member 90 which is a circular disk having a suitable thickness. A metal ring 92 is bonded to the outer circumferential surface of the rubber member 90 in the process of vulcanization of a rubber material for forming the rubber member 90. The rubber member 90 and the metal ring 92 constitute a second movable member 93. The second movable member 93 is press-fitted at the metal ring 92 in the upper open end portion of the lower metal member 86. The second movable member 93 fluid-tightly divides the space within the hollow structure of the first mounting member 12 into upper and lower sections on the sides of the upper and lower metal members 84, 86, respectively. The lower section partially defined by the lower metal member 86 functions as a second auxiliary fluid chamber 94, while the upper section partially defined by the upper metal member 84 functions as a second working air chamber 96. The second auxiliary fluid chamber 94 is filled with the same non-compressible fluid as the fluid filling the primary fluid chamber 39.

An orifice member 98 in the form of a circular disk made of a metallic material is bolted to the bottom wall of the lower metal member 86 of the first mounting member 12. The orifice member 98 cooperates with the bottom wall of the lower metal member 86 to define a second orifice 100 for fluid communication between the primary and second auxiliary fluid chambers 39, 94. The second orifice 100 extends in the circumferential direction of the orifice member 98 along a substantially entire but slightly smaller portion of the circumference of the orifice member 98. In the present second embodiment, the second orifice 100 is tuned to effectively damp the input vibrations whose frequencies are higher than the resonance frequency of the fluid flowing through the communication passage 50 between the primary and equilibrium fluid chambers 39, 40, and are lower than the resonance frequency of the fluid flowing through the first orifice 74 between the primary and first auxiliary fluid chambers 39, 62. For instance, the communication passage 50 is tuned to effectively damp low-frequency vibrations such as engine shakes, and the first orifice 74 is tuned to effectively damp high-frequency vibrations such as booming noise, while the second orifice 100 is tuned to effectively damp medium-frequency vibrations such as engine idling vibrations.

Like the first working air chamber 64 formed within the partition member 38, the second working air chamber 96 which is formed on the side of the second movable member 93 remote from the second auxiliary fluid chamber 94 is connected through an air inlet 102 to an external air conduit 104, which is connected to a switch valve 106. This switch valve 106 is switched for selective communication with the atmosphere and a vacuum tank 108 connected to the vacuum pressure source. With the switch valve 106 being switched at a suitable frequency, the atmospheric and reduced pressures are alternately applied to the second working air chamber 96, whereby a periodic change of the air pressure is induced in the second working air chamber 96.

When the reduced pressure is applied to the second working air chamber 96, the second movable member 93 is displaced toward the second working air chamber 96. When the atmospheric pressure is applied to the second working air chamber 96, the second movable member 93 is displaced toward the second auxiliary fluid chamber 94 by its own elastic force and is returned to its original position. As a result, the second movable member 93 is vertically reciprocated or oscillated at a frequency corresponding to the switching frequency of the second switch valve 106, thereby inducing a periodic fluid pressure change in the second auxiliary fluid chamber 94, to positively cause a periodic change in the fluid pressure difference between the primary and second auxiliary fluid chambers 39, 94. By oscillating the second movable member 93 at a frequency corresponding to the frequency of the input vibration, the fluid flows through the second orifice 100 between the primary and second auxiliary fluid chambers 39, 94 are positively induced, whereby the input vibration can be effectively damped based on the fluid flows through the second orifice 100.

Since the frequency band of the input vibrations that can be effectively damped by the fluid flows through the second orifice 100 is different from that of the input vibrations that can be effectively damped by the fluid flows through the first orifice 74, the present engine mount 82 is capable of exhibiting excellent vibration damping characteristics over a relatively wide frequency range of the input vibrations.

The present engine mount 82 does not require an actuator such as electromagnetic drive means for oscillating the second movable member 93, and is accordingly simple and compact in construction with reduced weight, but is capable of exhibiting a high vibration damping effect over a wide range of frequency of the input vibrations.

For improving the damping effect based on the resonance of the fluid flowing through the second orifice 100, it is effective and desirable to increase the amount of flow of the fluid through the second orifice 100, by holding the first movable member 52 stationary in a predetermined position with a predetermined air pressure applied to the first working air chamber 64, or by oscillating the movable member 52 with the oscillation phase that maximizes the amount of flow of the fluid through the second orifice 100 so as to increase the amount of change of the fluid pressure in the primary fluid chamber 39.

Figure 3:
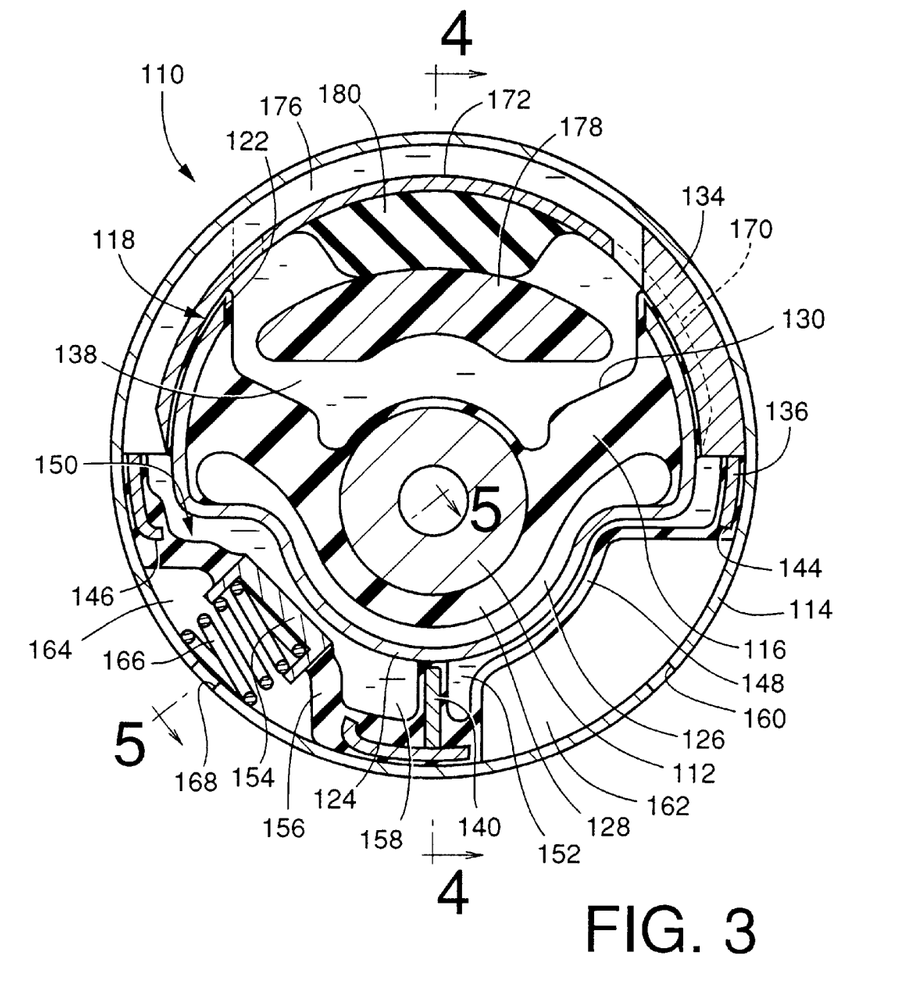
FIG. 3 is a transverse cross sectional view of an engine mount of cylindrical bushing type constructed according to a third embodiment of the invention.
Figure 4:
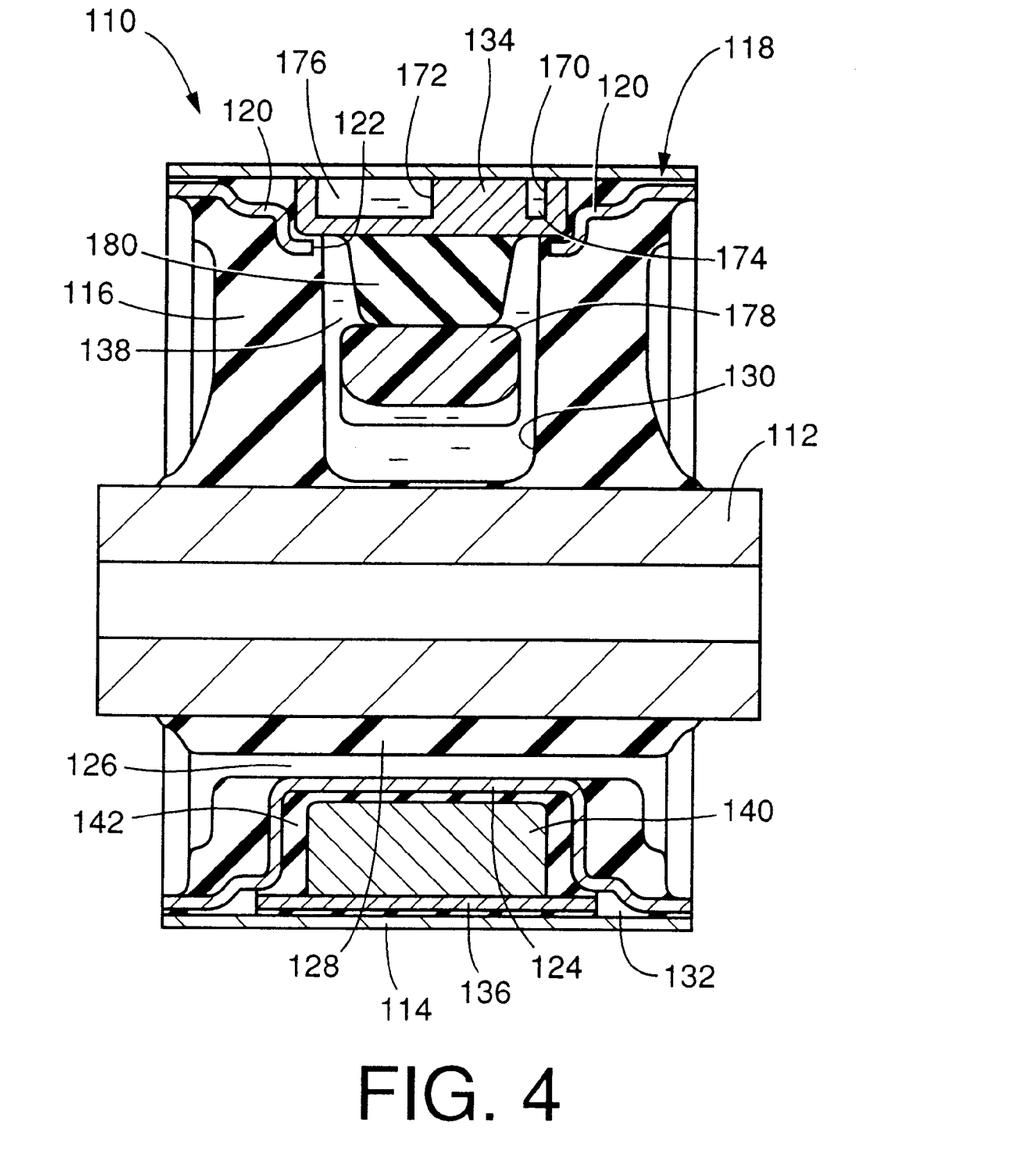
FIG. 4 is a cross sectional view taken along line 4—4 of FIG. 3.
Figure 5:
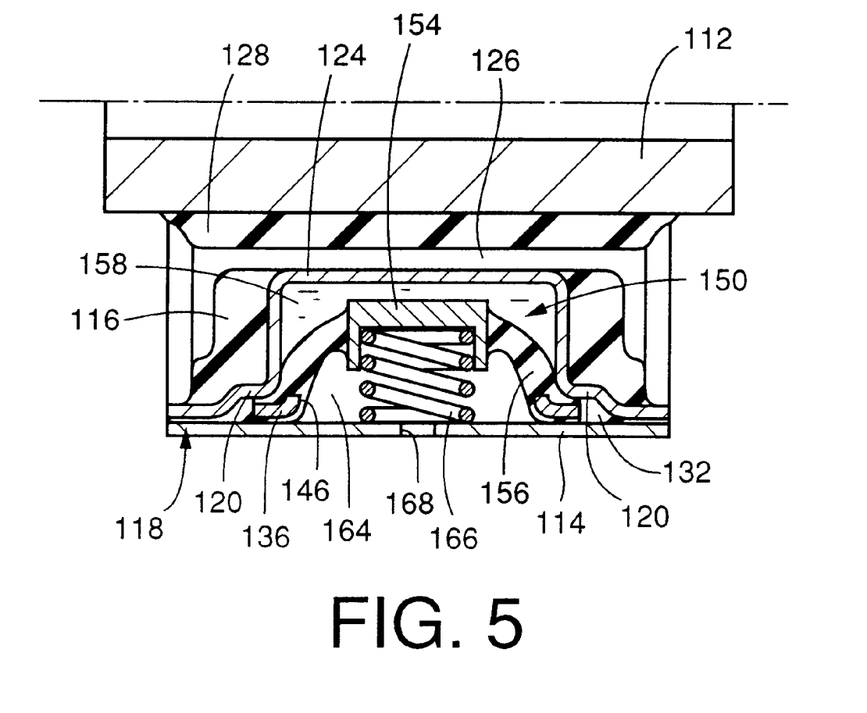
FIG. 5 is a cross sectional view taken along line 5—5 of FIG. 3.

Referring next to FIGS. 3–5, there will be described a cylindrical engine mount 110 constructed according to a third embodiment of this invention.

The engine mount 110 includes a first mounting member in the form of an inner sleeve 112, and a second mounting member in the form of an outer sleeve 114. These inner and outer sleeves 112, 114 are made of metallic materials, and are spaced apart from each other by a predetermined distance in the radial direction. The two sleeves 112, 114 are elastically connected to each other by an elastic body 116 interposed therebetween. The inner and outer sleeves 112, 114 are fixed to one and the other of the power unit and body of a motor vehicle, so that the power unit is mounted on the vehicle body in a vibration damping manner. Before installation of the engine mount 110 on the vehicle, the inner and outer sleeves 112, 114 are disposed eccentrically with respect to each other with a given radial offset distance. With the engine mount 110 installed on the vehicle, the elastic body 116 is elastically compressed with the weight of the power unit acting thereon, and the inner and outer sleeves 112, 114 are brought into a substantially concentric or coaxial relationship with each other. The engine mount 110 is positioned such that the direction of offset of the inner and outer sleeves 112, 114 prior to the installation on the vehicle coincides with the vertical direction, so that the engine mount 110 is capable of damping the vibrations applied thereto in the vertical direction (as seen in FIG. 3) or a direction almost parallel to the vertical direction.

Described in detail, the inner sleeve 112 is a cylindrical member having a relatively large wall thickness and a relatively small diameter. A metallic intermediate sleeve 118 is disposed radially outwardly of the inner sleeve 112 such that the intermediate sleeve 118 is radially offset by a given amount with respect to the inner sleeve 112. This intermediate sleeve 118 is a cylindrical member having a relatively small wall thickness and a relatively large diameter. The intermediate sleeve 118 has two stepped or shoulder portions 120 with a smaller diameter near the opposite axial ends, as shown in FIGS. 4 and 5. The shoulder portions 120 are formed over the entire circumference of the intermediate sleeve 118. The intermediate sleeve 118 has a window 122 in an upper one of two circumferential parts thereof which are diametrically opposed to each other in the direction of offset with respect to the inner sleeve 112. An axially intermediate portion of the intermediate sleeve 118 has a recessed portion 124 in the other or lower circumferential part which is nearer to the axis of the inner sleeve 112 in the offset direction, than the upper circumferential part having the window 122. The recess of the recessed portion 124 is open in the radially outward direction.

The elastic body 116 is interposed between the inner sleeve 112 and the intermediate sleeve 118 such that the inner and intermediate sleeves 112, 118 are bonded at their respective outer and inner circumferential surfaces to the elastic body 116, in the process of vulcanization of a rubber material to form the elastic body 116. An axial void 126 is left between the inner and intermediate sleeves 112, 118, so as to extend over the entire axial length of the engine mount 110. This axial void 126 is located in a circumferential portion of the engine mount 110 corresponding to the recessed portion 124 of the intermediate sleeve 118, and has a circumferential dimension almost equal to a half of the entire circumference of the intermediate sleeve 118. In the presence of the axial void 126, the elastic body 116 between the inner and intermediate sleeves 112, 118 is almost entirely disposed on only the upper side of the inner sleeve 112, namely, on only one of the vertically opposite sides of the inner sleeve 112 on which the radial offset distance to the intermediate sleeve 118 is larger than on the other side. This arrangement is effective to reduce a tensile stress acting on the elastic body 116 due to the weight of the power unit. A rubber buffer 128 is provided to cover a portion of the outer circumferential surface of the inner sleeve 112 on the side of the axial void 126. Upon application of an excessive vibrational load to the engine mount 110, the inner sleeve 112 may abut on the recessed portion 124 of the intermediate sleeve 118 through the rubber buffer 128, so as to prevent an excessive amount of tensile deformation of the elastic body 116.

The elastic body 116 has a pocket 130 aligned with the window 122 of the intermediate sleeve 118. That is, the pocket 130 is formed in a circumferential portion of the elastic body 116 at which the vertical offset distance between the inner and intermediate sleeves 112, 118 is the largest. The pocket 130 is open in the outer circumferential surface of the intermediate sleeve 118 through the window 122. On the outer circumferential surface of the intermediate sleeve 118, a sealing rubber layer 132 having a relatively small wall thickness is formed integrally with the elastic body 116, as shown in FIGS. 4 and 5.

The inner and intermediate sleeves 112, 118 and the elastic body 116 constitute an intermediate product, which is prepared by vulcanizing a rubber material to form the elastic body 116, within a mold in which the inner and intermediate sleeves 112, 118 are positioned relative to each other. On this intermediate product, there are fitted an orifice member 134 and a retainer member 136, on which is finally fitted the outer sleeve 114 to produce the present engine mount 110. The orifice member 134 and the retainer member 136 are both substantially semi-cylindrical members, which cooperate to constitute a cylindrical structure fitted on an axially intermediate portion of the outer circumferential surface of the intermediate sleeve 118. The outer sleeve 114, which is a cylindrical member having a relatively large diameter, is then fitted on the intermediate sleeve 118 so as to cover the outer circumferential surface of the cylindrical structure consisting of the orifice and retainer members 134, 136.

The substantially semi-cylindrical orifice member 134 has a relatively large wall thickness, and is fitted on an upper portion of the outer circumferential surface of the intermediate sleeve 118, at which the radial offset distance to the inner sleeve 112 is relatively large. The orifice member 134 is fitted on the intermediate sleeve 118 such that the opposite axial end portions and the opposite circumferential end portions of the orifice member 134 are held in contact with the respective four portions of the intermediate sleeve 118 which define the rectangular window 122, so that the window 122 aligned with the pocket 130 of the elastic body 116 is fluid-tightly closed by the orifice member 134, whereby a primary fluid chamber 138 is defined by the inner sleeve 112, the elastic body 116 (pocket 130) and the orifice member 134. The primary fluid chamber 138 is filled with a non-compressible fluid such as water, alkylene glycol, polyalkylene glycol or silicone oil. The pressure of the fluid in the primary fluid chamber 138 is periodically changed due to elastic deformation of the elastic body 116 upon application of a vibrational load to the engine mount 110.

On the other hand, the substantially semi-cylindrical retainer member 136 has a relatively small wall thickness, and is fitted on a lower portion of the outer circumferential surface of the intermediate sleeve 118, at which the radial offset distance to the inner sleeve 112 is relatively small. The retainer member 136 is fitted on the intermediate sleeve 118 such that the opposite axial end portions of the retainer member 136 are supported by the shoulder portions 120 of the intermediate sleeve 118, so that the recessed portion 124 is closed by the retainer member 136. The retainer member 136 has a partition wall 140 fixed to a circumferentially intermediate portion thereof so as to extend in the radially inward direction, through the recessed portion 124 of the intermediate sleeve 118, as shown in FIG. 3. The free end of the partition wall 140 is held in close contact with the surface of the recessed portion 124, so that the partition wall 140 divides the recess of the recessed portion 124 into two fluid tight sections on the opposite sides thereof. These two sections of the recess are arranged in the circumferential direction of the intermediate sleeve 118. To secure fluid tightness of those two sections of the recess, the end face of the partition wall 140 in contact with the recessed portion 124 is covered with a sealing rubber member 142.

The retainer member 136 has a first opening 144 and a second opening 146 formed in respective two circumferential portions thereof on the circumferentially opposite sides of the partition wall 140. These first and second openings 144, 146 are fluid-tightly closed by a flexible diaphragm 148 and a movable member 150, respectively.

The flexible diaphragm 148 has a relatively small thickness and is easily deformable or displaceable. The flexible diaphragm 148 is bonded by vulcanization to the edge of the first opening 144 and is accommodated in one of the above-indicated two sections of the recess of the recessed portion 124 on one of the opposite sides of the partition wall 140, such that the diaphragm 148 is curved radially inwardly of the outer sleeve 114, as shown in FIG. 3. The flexible diaphragm 148 cooperates with the intermediate sleeve 118 to define a fluid-tightly enclosed equilibrium fluid chamber 152 filled with the same non-compressible fluid as the fluid filling the primary fluid chamber 138. The flexible diaphragm 148 also cooperates with the outer sleeve 114 to define an atmospheric pressure chamber 162 which communicates with the atmosphere through an air vent 160 and which facilitates deformation or displacement of the flexible diaphragm 148.

The movable member 150 consists of a circular metal disk 154, and an annular rubber member 156 bonded by vulcanization to the outer circumferential surface of the metal disk 154. The movable member 150 is bonded at the periphery of the rubber member 156 to the edge of the second opening 146 and is accommodated in the other of the above-indicated two sections of the recess of the recessed portion 124 on the other side of the partition wall 140, such that the metal disk 154 is spaced apart from the outer sleeve 114 radially inwardly of the outer sleeve 114. The movable member 150 cooperates with the intermediate sleeve 118 to define an auxiliary fluid chamber 158 filled with the same non-compressible fluid as the fluid filling the primary fluid chamber 138.

The movable member 150 also cooperates with the outer sleeve 114 to define a working air chamber 164, which is provided on the side of the movable member 150 remote from the auxiliary fluid chamber 158. A coil spring 166 is accommodated in the working air chamber 164, between the outer sleeve 114 and the metal disk 154, for biasing the movable member 150 in the direction from the outer sleeve 114 toward the auxiliary fluid chamber 158, so that the metal disk 154 is normally held in a radially inner position radially spaced apart from the outer sleeve 114, with the annular rubber member 156 being elastically deformed.

The outer sleeve 114 partially defining the working air chamber 164 has an air inlet 168 formed therethrough in communication with the working air chamber 164. An air conduit connected to a suitable air pressure source and a switch valve is connected to this air inlet 168. As in the first and second embodiments, the working air chamber 164 is exposed alternately to the reduced and atmospheric pressures, with the switch valve being switched between its two positions, whereby the air pressure in the working air chamber 164 is periodically changed to oscillate the movable member 150 in the radial direction of the engine mount 110, between the radially inner position on the side of the auxiliary fluid chamber 158 and a radially outer position on the side of the working air chamber 164.

The orifice member 134 has a first groove 170 and a second groove 172 formed in the outer circumferential surface. These grooves 170, 172, which have suitable lengths, are closed by the outer sleeve 114 to define a communication passage 174 for fluid communication between the primary and equilibrium fluid chambers 138, 152, and an orifice 176 for fluid communication between the primary and auxiliary fluid chambers 138, 158. The communication passage and orifice 174, 176 are independent of each other, and permit the fluid to flow between the primary and equilibrium fluid chambers 138, 152, and the primary and auxiliary chambers 138, 158, upon application of the input vibrations to the engine mount 110, so that the vibrations can be damped based on the resonance of the fluid flowing through the passage and orifice 174, 176.

The communication passage 174 is tuned such that the resonance frequency of the fluid flowing through the passage 174 is lower than that of the orifice 176, so that the input vibrations having relatively low frequencies can be effectively damped based on the resonance of the fluid flowing through the communication passage 174.

In other words, the orifice 176 is tuned to effectively damp the medium-frequency vibrations whose vibrations are higher than the resonance frequency of the fluid flowing through the communication passage 174. By oscillating the movable member 150 with a suitable phase difference between the oscillation frequency of the movable member 150 and the frequency of the input vibration, a periodic fluid pressure change is induced within the auxiliary fluid chamber 158, for effectively induce the fluid flows between the primary and auxiliary fluid chambers 138, 158 through the orifice 176, so that the vibration damping effect can be significantly improved with active control of the vibration damping characteristics of the engine mount 110 by the oscillation of the movable member 150.

Like the engine mounts 10, 82 of the first and second embodiments, the present cylindrical engine mount 110 does not require an actuator such as electromagnetic drive means for oscillating the movable member 150, and is accordingly simple and compact in construction with reduced weight and is comparatively easy and economical to manufacture. Thus, the present engine mount 110 has substantially the same advantages as the engine mounts 10, 82.

In the engine mount 110, a movable block 178 having dimensions considerably smaller than the dimensions of the primary fluid chamber 138 is displaceably accommodated in the primary fluid chamber 138. The movable block 178 cooperates with the inner surfaces of the primary fluid chamber 138 to define a fluid passage around the movable block 178. The fluid flows through this fluid passage partially defined by the movable block 178 are effective to damp relatively high-frequency vibrations such as booming noises, which cannot be effectively damped based on the fluid flows through the orifice 176.

To the orifice member 134, there is bonded a rubber stopper 180 which extends into the primary fluid chamber 138. Upon an excessively large relative displacement between the inner and outer sleeves 112, 114 in a bound direction, the rubber stopper 180 and the movable block 178 abut on each other. Thus, the rubber stopper 180 and the movable block 178 prevent an excessive amount of elastic deformation of the elastic body 116.

In the present engine mount 110, too, the reduced pressure used together with the atmospheric pressure for oscillating the movable member 150 may be replaced by a positive pressure. Further, the reduced and atmospheric pressures may be replaced by two different values of a reduced or positive pressure.

The coil spring 166 disposed in the working air chamber 164 is not essential and may be eliminated. In the absence of the coil spring 166, the movable member 150 is returned to the original position (radially inner position) by its own elasticity only.

While the communication passage 174 and equilibrium fluid chamber 152 are provided to provide the engine mount 110 with the desired damping characteristic in the third embodiment, the provision of these passage and chamber 174, 152 is not essential.

The flexible diaphragm 148, atmospheric pressure chamber 162, equilibrium fluid chamber 152 and communication passage 174 may be modified to provide a second movable member, a second working air chamber, a second auxiliary fluid chamber and a second orifice, respectively.

While the fluid-filled vibration damping devices in the form of the engine mounts 10, 82, 110 for motor vehicles have been described above, the principle of the present invention is also applicable to other types of fluid-filled vibration damping devices for motor vehicles, such as body mounts, differential mounts and suspension bushings, and also to various dampers not used for the motor vehicles.

Although the presently preferred embodiments of the invention have been described above in detail for illustrative purpose only, it is to be understood that the invention is not limited to the details of these illustrated embodiments, but may be embodied with various changes, modifications and improvements, which may occur to those skilled in the art, without departing from the spirit and scope of the present invention defined in the following claims:

What is claimed is:

1. A fluid-filled vibration damping device including (a) a first and a second mounting member which are spaced apart from each other, (b) an elastic body elastically connecting the first and second mounting members and partially defining a primary fluid chamber filled with a non-compressible fluid, a pressure of which changes upon application of a vibrational load between said first and second mounting members, (c) a movable member which partially defines an auxiliary fluid chamber filled with the non-compressible fluid and which is oscillated to cause a periodic change of a pressure of the fluid in the auxiliary fluid chamber, and (d) means for defining an orifice for fluid communication between the primary and auxiliary fluid chambers, wherein an improvement comprises:

said movable member partially defining a working air chamber on one of opposite sides thereof which is remote from said auxiliary fluid chamber; and a pressure control device connected to said working air chamber, for periodically changing an air pressure in said working air chamber in synchronization with a frequency of said vibrational load, wherein said movable member is oscillated with a periodic change of said air pressure in synchronization with the frequency of said vibrational load.

2. A fluid-filled vibration damping device according to claim 1, wherein said movable member includes a rubber member which produces an elastic force for restoring said rubber member to an original shape thereof during oscillation thereof.

3. A fluid-filled vibration damping device according to claim 1, further comprising biasing means for biasing said movable member in a predetermined direction.

4. A fluid-filled vibration damping device according to claim 1, wherein said movable member consists of a plurality of mutually independent movable members which partially define respective mutually independent auxiliary fluid chambers which communicate with said primary fluid chamber through respective mutually independent orifices.

5. A fluid-filled vibration damping device according to claim 1, further comprising at least one flexible diaphragm partially defining an equilibrium fluid chamber filled with said non-compressible fluid such that a volume of said equilibrium fluid chamber is variable, and means for defining at least one communication passage for fluid communication between said equilibrium and primary fluid chambers.

6. A fluid-filled vibration damping device according to claim 5, wherein said communication passage for fluid communication between said primary and equilibrium chambers and said orifice for fluid communication between said primary and auxiliary fluid chambers are tuned such that a frequency of the vibrational load which is effectively damped by the flows of the fluid through said communication passage is lower than that of the vibrational load which is effectively damped by the flows of the fluid through said orifice.

7. A fluid-filled vibration damping device according to claim 1, wherein said first mounting member consists of an inner sleeve, while said second mounting member consists of an outer sleeve disposed radially outwardly of said inner sleeve, said elastic body being interposed between said inner and outer sleeves, said primary and auxiliary fluid chambers being formed between said inner and outer sleeves such that said primary and auxiliary fluid chambers are spaced from each other in a circumferential direction of said inner and outer sleeves.

8. A fluid-filled vibration damping device according to claim 7, further comprising an intermediate sleeve which is fitted on an outer circumferential surface of said elastic body and which has a window formed therethrough, said elastic body having a pocket formed in said outer circumferential surface thereof and open in the outer circumferential surface of said intermediate sleeve through said window, said outer sleeve being fitted on said outer circumferential surface of said intermediate sleeve so as to close said window and cooperating with said pocket to define said primary fluid chamber, said intermediate sleeve having a recessed portion open in said outer circumferential surface thereof, said movable member cooperating with said outer sleeve to define said working air chamber on said one of said opposite sides thereof, and cooperating with said recessed portion to define said auxiliary fluid chamber on the other of said opposite sides.

9. A fluid-filled vibration damping device according to claim 1, wherein said pressure control device includes an air pressure source and a switch valve for selectively connecting said working air chamber to said air pressure source and an atmosphere.

* * * * *